UNITED STATES PATENT OFFICE.

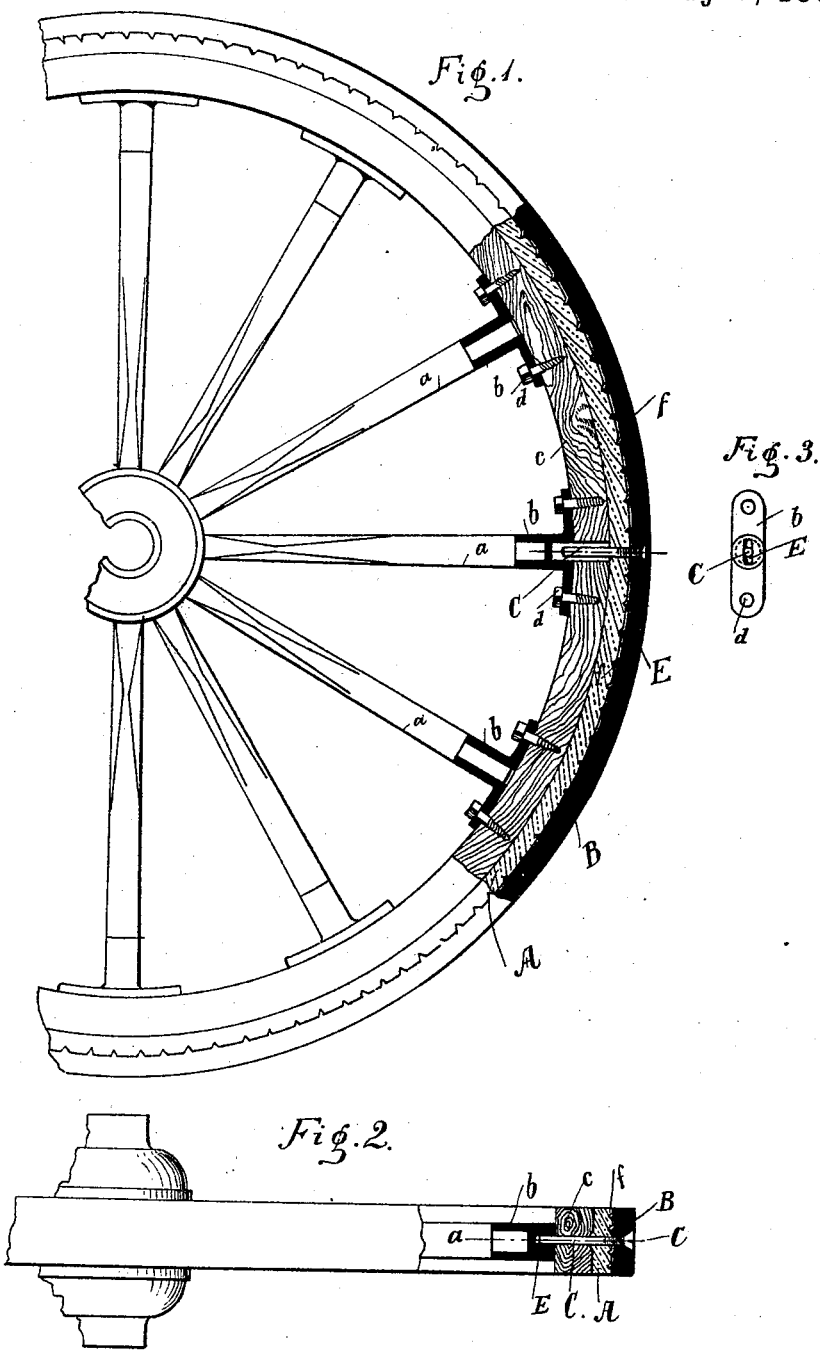

ANATOL METZGER, OF MOSCOW, RUSSIA.

ELASTIC TIRE FOR WHEELS.

SPECIFICATION forming part of Letters Patent No. 538,689, dated May 7, 1895.

Application filed October 24, 1894. Serial No. 526,852. (No model.)

*To all whom it may concern:*

Be it known that I, ANATOL METZGER, a subject of the Emperor of Russia, and a resident of Moscow, in the Empire of Russia, have invented a new and useful Wheel with Elastic Tire, of which the following is a specification.

The wheel with elastic tire forming the object of the present invention, is characterized by having an elastic india rubber ring inserted between the felly proper and the ordinary outer metal tire, by means of which arrangement is attained a perfectly elastic wheel, which possesses at the same time a great resistance against outer influences.

On the accompanying drawings, Figure 1 shows a side view of such a wheel, partly in section. Fig. 2 is an edge view of such a wheel, taken partly in section through one of the spokes. Fig. 3 is a view of a socket adapted for the connection of the spokes to the felly.

Around the felly proper $c$ is placed the elastic india-rubber ring A, and around this, again, the iron tire B. It is advantageous to have small projections $f$ on the latter, which produce a firm connection between the india-rubber ring A and the iron tire B. The iron tire B is provided with pins C projecting inward, which pass through the india rubber ring A and into slots E, which are arranged in the felly proper $c$, and, as is shown on the drawings, may also project into the shoe $b$. These pins C permit a slight play of the tire B against the felly proper $c$, which is necessary in order to allow of the elastic effect of the india rubber ring A.

The socket $b$ is adapted for connecting the spoke $a$ with the felly proper $c$. Into the socket hole is wedged the tenon of the spoke $a$, and the socket is then fastened with screws $d$ to the felly $c$.

What I claim is—

In a wheel the combination of the felly $c$, the outer metal tire B, having small projections $f$, the elastic india-rubber ring A, the guiding slots E, the guiding-pins C and the sockets $b$ as and for the purpose specified.

ANATOL METZGER.

Witnesses:
FERDINAND KOBITZSCH,
HERMANN JURENZ.